US012674453B2

(12) United States Patent
Takada

(10) Patent No.: US 12,674,453 B2
(45) Date of Patent: Jul. 7, 2026

(54) PUMP ASSEMBLY

(71) Applicant: Sumitomo Electric Sintered Alloy, Ltd., Takahashi (JP)

(72) Inventor: Shoichi Takada, Takahashi (JP)

(73) Assignee: Sumitomo Electric Sintered Alloy, Ltd., Takahashi (JP)

( * ) Notice: Subject to any disclaimer, the term of this patent is extended or adjusted under 35 U.S.C. 154(b) by 222 days.

(21) Appl. No.: 18/730,026

(22) PCT Filed: Aug. 31, 2023

(86) PCT No.: PCT/JP2023/031907
§ 371 (c)(1),
(2) Date: Jul. 18, 2024

(87) PCT Pub. No.: WO2024/135000
PCT Pub. Date: Jun. 27, 2024

(65) Prior Publication Data
US 2026/0185523 A1 Jul. 2, 2026

(30) Foreign Application Priority Data
Dec. 19, 2022 (JP) ................................. 2022-202208

(51) Int. Cl.
*F04C 11/00* (2006.01)
*F04C 2/10* (2006.01)
(Continued)

(52) U.S. Cl.
CPC ............ *F04C 11/008* (2013.01); *F04C 2/102* (2013.01); *F04C 2/344* (2013.01); *F04C 15/008* (2013.01); *H02K 9/193* (2013.01); *F04C 2240/40* (2013.01)

(58) Field of Classification Search
CPC ........ F04C 11/008; F04C 2/084; F04C 2/102; F04C 2/344; F04C 15/008; F04C 2240/40;
(Continued)

(56) References Cited

U.S. PATENT DOCUMENTS

| | | | | |
|---|---|---|---|---|
| 5,145,329 A | * | 9/1992 | Zumbusch | .............. F04C 2/102 |
| | | | | 417/356 |
| 8,182,235 B2 | * | 5/2012 | Morgan, Jr. | ............ F04C 2/102 |
| | | | | 417/16 |

(Continued)

FOREIGN PATENT DOCUMENTS

| | | |
|---|---|---|
| EP | 4339460 A1 | 3/2024 |
| JP | 2002-512333 A | 4/2002 |

(Continued)

*Primary Examiner* — Mark A Laurenzi
*Assistant Examiner* — Benjamin Doyle
(74) *Attorney, Agent, or Firm* — XSENSUS LLP

(57) ABSTRACT

A pump assembly includes an axial gap motor including a stator, a motor rotor, and a motor shaft, and a pump including a pump rotor configured to be rotated by the motor rotor and a pump housing configured to house the pump rotor. The stator includes a yoke having an annular shape, and a plurality of teeth disposed on a first surface of the yoke. The pump is disposed in an internal space surrounded by the plurality of teeth. The pump housing has a passage space formed in an interior of the pump housing, and a leak passage opened from the passage space toward the motor rotor.

7 Claims, 7 Drawing Sheets

(51) Int. Cl.
    *F04C 2/344*        (2006.01)
    *F04C 15/00*        (2006.01)
    *H02K 9/193*        (2006.01)

(58) Field of Classification Search
    CPC .......... F04B 17/03; F04B 1/20; F04B 1/2064;
                 F04B 23/14; H02K 5/20; H02K 9/193;
             H02K 5/203; H02K 1/2796; H02K 1/32;
                          H02K 21/24; H02K 9/19
    USPC .......................................................... 417/366
    See application file for complete search history.

(56)                  References Cited

U.S. PATENT DOCUMENTS

| | | | | |
|---|---|---|---|---|
| 8,449,269 | B2 * | 5/2013 | Yamamori | F04C 2/102 |
| | | | | 417/354 |
| 9,163,626 | B2 * | 10/2015 | Frank | F04C 2/086 |
| 10,514,035 | B2 * | 12/2019 | Hemphill | F04C 2/103 |
| 2010/0158725 | A1 * | 6/2010 | Werson | F04D 13/0633 |
| | | | | 417/423.12 |

| | | | | |
|---|---|---|---|---|
| 2018/0128268 | A1 * | 5/2018 | Bornemann | F04C 15/008 |
| 2018/0216620 | A1 * | 8/2018 | Turner | H02K 5/12 |
| 2019/0055941 | A1 * | 2/2019 | Bornemann | F04C 2/12 |
| 2019/0383292 | A1 * | 12/2019 | Kreidler | H02K 5/15 |
| 2020/0173339 | A1 * | 6/2020 | Russalian | F04D 29/126 |
| 2021/0288554 | A1 * | 9/2021 | Yao | H02K 5/203 |
| 2021/0320578 | A1 * | 10/2021 | Sheth | H02K 5/132 |
| 2021/0351658 | A1 * | 11/2021 | Jore | H02K 5/203 |
| 2022/0149684 | A1 * | 5/2022 | Tanaka | H02K 1/182 |
| 2022/0186736 | A1 * | 6/2022 | McSheery | F04D 29/2261 |
| 2022/0329132 | A1 * | 10/2022 | Guedes-Pinto | H02K 9/19 |
| 2022/0372973 | A1 * | 11/2022 | Dupeu | F04C 2/10 |
| 2023/0044524 | A1 * | 2/2023 | Russalian | H02K 15/03 |
| 2026/0002540 | A1 * | 1/2026 | Tiller | F04D 13/08 |

FOREIGN PATENT DOCUMENTS

| | | | |
|---|---|---|---|
| JP | 2020-143657 | A | 9/2020 |
| JP | 2020-182269 | A | 11/2020 |
| WO | 99/053974 | A2 | 10/1999 |
| WO | 2018/062094 | A1 | 4/2018 |
| WO | 2022/239484 | A1 | 11/2022 |

* cited by examiner

PUMP ASSEMBLY

CROSS-REFERENCE TO RELATED APPLICATIONS

The present application is a national stage application, pursuant to 35 U.S.C. § 371, of International Patent Application No. PCT/JP2023/031907, filed on Aug. 31, 2023, which claims priority from Japanese Patent Application No. 2022-202208, filed on Dec. 19, 2022, the entire contents of each are incorporated herein by reference.

TECHNICAL FIELD

The present disclosure relates to a pump assembly.

BACKGROUND ART

An axial gap motor includes a stator, a motor rotor, and a motor shaft. In the axial gap motor, the magnetic flux from the stator to the rotor flows in parallel to the axis of the motor shaft. The axial gap motor has an advantage of a small length along the axis.

PTL 1 discloses a pump assembly combining an axial gap motor and an electric pump for pumping fluid. In this pump assembly, the axial gap motor and the electric pump are arranged side by side in a direction along the axis of the motor shaft. Such a pump assembly is compact, taking advantage of the small axial gap motor size along the axis. In the pump assembly using the radial gap motor, the size of the motor shaft along the axis is large.

CITATION LIST

Patent Literature

PTL 1: Japanese Unexamined Patent Application Publication No. 2020-182269

SUMMARY OF INVENTION

A pump assembly of the present disclosure includes an axial gap motor including a stator, a motor rotor, and a motor shaft, and a pump including a pump rotor configured to be rotated by the motor rotor and a pump housing configured to house the pump rotor. The stator includes a yoke having an annular shape, and a plurality of teeth disposed on a first surface of the yoke. The pump is disposed in an internal space surrounded by the plurality of teeth. The pump housing has a passage space formed in an interior of the pump housing, and a leak passage opened from the passage space toward the motor rotor.

DETAILED DESCRIPTION

Figure 1:
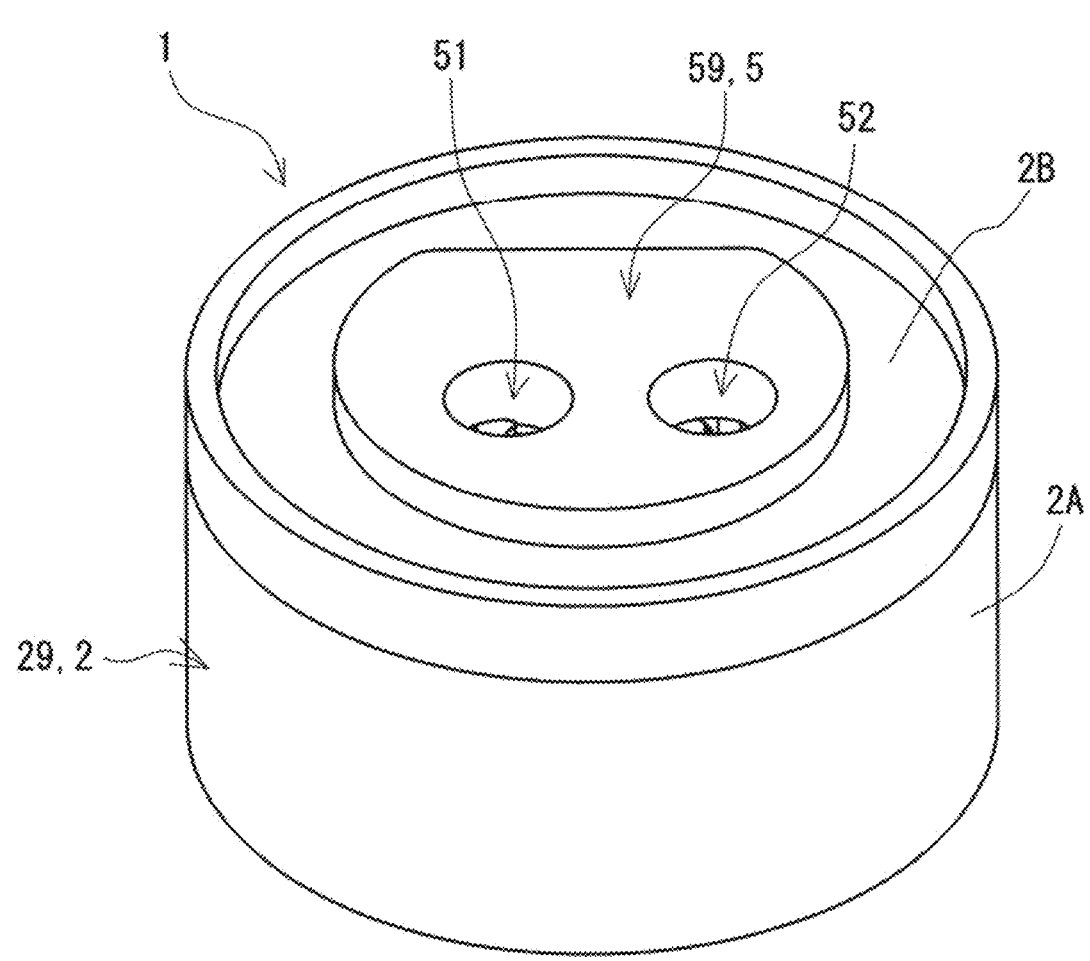
FIG. 1 is a schematic perspective view of a pump assembly according to the first embodiment.

Problems to be Solved by Present Disclosure

The pump assembly is used, for example, to supply oil to a drive mechanism of a vehicle. In this case, the pump assembly is disposed in a limited narrow space such as an engine room of an automobile. Therefore, even when the axial gap motor is used, a pump assembly having a smaller length along the axis is required.

The axial gap motor generates heat during operation, and the performance may be degraded. There is a problem that the size of the pump assembly increases by separately providing the pump assembly with a cooling mechanism to cool the axial gap motor.

One object of the present disclosure is to provide a compact pump assembly that is less likely to cause a failure due to heat generation.

Advantageous Effects of Present Disclosure

The pump assembly of the present disclosure is less likely to cause a failure due to heat generation and is more compact than conventional pump assemblies.

Description of Embodiments of Present Disclosure

First, embodiments of the present disclosure will be listed and described.

<1> A pump assembly of the present disclosure includes an axial gap motor including a stator, a motor rotor, and a motor shaft, and a pump including a pump rotor configured to be rotated by the motor rotor and a pump housing configured to house the pump rotor. The stator includes a yoke having an annular shape, and a plurality of teeth disposed on a first surface of the yoke. The pump is disposed in an internal space surrounded by the plurality of teeth. The pump housing has a passage space formed in an interior of the pump housing, and a leak passage opened from the passage space toward the motor rotor.

In the pump assembly described in the <1>, the pump is disposed in the internal space of the axial gap motor surrounded by the plurality of first teeth. Therefore, the length along the axis of the motor shaft in the pump assembly described in the <1> is smaller than the length along the axis of the motor shaft in the conventional pump assemblies. The pump rotor rotated by the motor rotor may be coaxially fixed to the motor shaft.

In the pump assembly described in the <1>, a part of the fluid flowing through the passage space of the pump housing leaks to the motor rotor through the leak passage. The leaked fluid may spread over the entire surface of the motor rotor by the centrifugal force of the motor rotor, or may be scattered to the interior of the axial gap motor and adhere to the stator. At this time, the fluid takes away heat from the motor rotor and the stator, and the axial gap motor is subjected to cool. Therefore, the pump assembly described in the <1> can suppress the problem associated with the heat generation of the axial gap motor, while having a simple configuration without an additional cooling mechanism. The fluid in the present disclosure may be a liquid, a gas, or a mixture of a liquid and a gas.

In the pump assembly described in the <1>, the pump is disposed in the internal space. That is, the pump is disposed inside the axial gap motor and is surrounded by the constituent members of the axial gap motor. Therefore, the operating noise of the pump is unlikely to leak to the outside of the pump assembly. Therefore, the pump assembly described in the <1> is excellent in quietness.

In the pump assembly described in the <1>, the temperature of the pump disposed in the internal space of the axial gap motor is likely to rise due to heat generation of the axial gap motor. When the temperature of the pump rises, the temperature of the fluid in the pump rises, and the viscosity of the fluid decreases. As a result, the load of the axial gap motor is reduced, and the power consumption of the axial gap motor is reduced. In particular, after the start of the axial gap motor in which the temperature of the fluid is low, the load of the axial gap motor is likely to be reduced at an early stage. The pump disposed in the internal space has a high heat capacity due to its structure. Therefore, the pump easily receives heat generated by the axial gap motor, and can suppress heat generation of the axial gap motor.

<2> In the pump assembly described in the <1>, the pump housing may have a through hole communicating with the interior and an outside of the pump housing. A portion of the motor shaft may be disposed in the interior of the pump housing by extending through the through hole. The leak passage may be formed of a gap between the through hole and the motor shaft.

The gap between the through hole of the pump housing and the motor shaft is very narrow. By using this gap as a leak passage, it is possible to suppress excessive leakage of the fluid from the pump. Therefore, the axial gap motor can be cooled without impairing the fluid pumping capacity of the pump.

<3> In the pump assembly described in the <1> or <2>, the pump may have an inlet port and an outlet port. The inlet port and the outlet port may be arranged in a first direction as viewed from the pump rotor. The first direction is a direction along an axis of the motor shaft and is a direction away from the motor rotor.

Since the motor rotor does not exist in the first direction as viewed from the pump rotor, the inlet port and the outlet port can be easily arranged. Further, since the inlet port and the outlet port are arranged in the first direction, an increase in the diameter of the stator core is suppressed.

Unlike the configuration described in the <3>, when the inlet port and the outlet port are arranged in the radial direction, the inlet port and the outlet port are arranged in a gap between a plurality of teeth arranged in the yoke having an annular shape. The radial direction is a direction orthogonal to the axis of the motor shaft and is a direction away from the axis. The inlet port and the outlet port along the radial direction increase the interval between the plurality of teeth, and thus the diameter of the stator core is likely to increase.

<4> In the pump assembly described in any one of <1> to <3>, the axial gap motor may include a motor housing. The motor housing may have a drain passage communicating with an interior and an outside of the motor housing.

When the viscosity of the fluid is high, the motor rotor is difficult to rotate due to the fluid accumulated in the interior of the axial gap motor. Fluid in the interior of the axial gap motor is discharged to the outside through the drain passage. Therefore, in the pump assembly described in the <4>, it is possible to prevent a problem caused by the fluid accumulating in the interior of the axial gap motor.

<5> In the pump assembly according to any one of <1> to <4>, the pump may be an internal gear pump including an external gear and an internal gear. The external gear may be the pump rotor.

The internal gear pump with the external gear disposed inside the internal gear is compact. The internal gear pump is easily disposed in the internal space having a size restriction. Also, the internal gear pump is more space efficient than other pumps of the same size. Therefore, the pump assembly described in the <5> is compact and can easily increase the flow rate of the fluid.

<6> In the pump assembly described in any one of <1> to <4>, the pump may be a vane pump. The pump rotor may include a plurality of vanes.

The vane pump having the pump rotor with a plurality of vanes is compact. The vane pump is easily arranged in the internal space having a size restriction. Further, the vane pump has excellent sealing performance, and therefore, can easily pump even a gas, a liquid, or a mixture of a gas and a liquid.

<7> In the pump assembly described in the <3>, the pump housing may have a return passage configured to allow communication between the internal space and the inlet port.

The return passage allows the fluid that has leaked into the internal space of the axial gap motor to return to the passage space of the pump. Therefore, the fluid that has cooled the axial gap motor is not wasted.

Details of Embodiments of Present Disclosure

Hereinafter, specific examples of the pump assembly of the present disclosure will be described with reference to the drawings. In the drawings, the same reference numerals denote the same or corresponding parts. The size of the members shown in the drawings is expressed for the purpose of clarifying the description, and does not necessarily represent the actual size. The present invention is not limited to these examples, but is defined by the scope of the claims, and is intended to include all modifications within the meaning and scope equivalent to the scope of the claims.

First Embodiment

Figure 2:
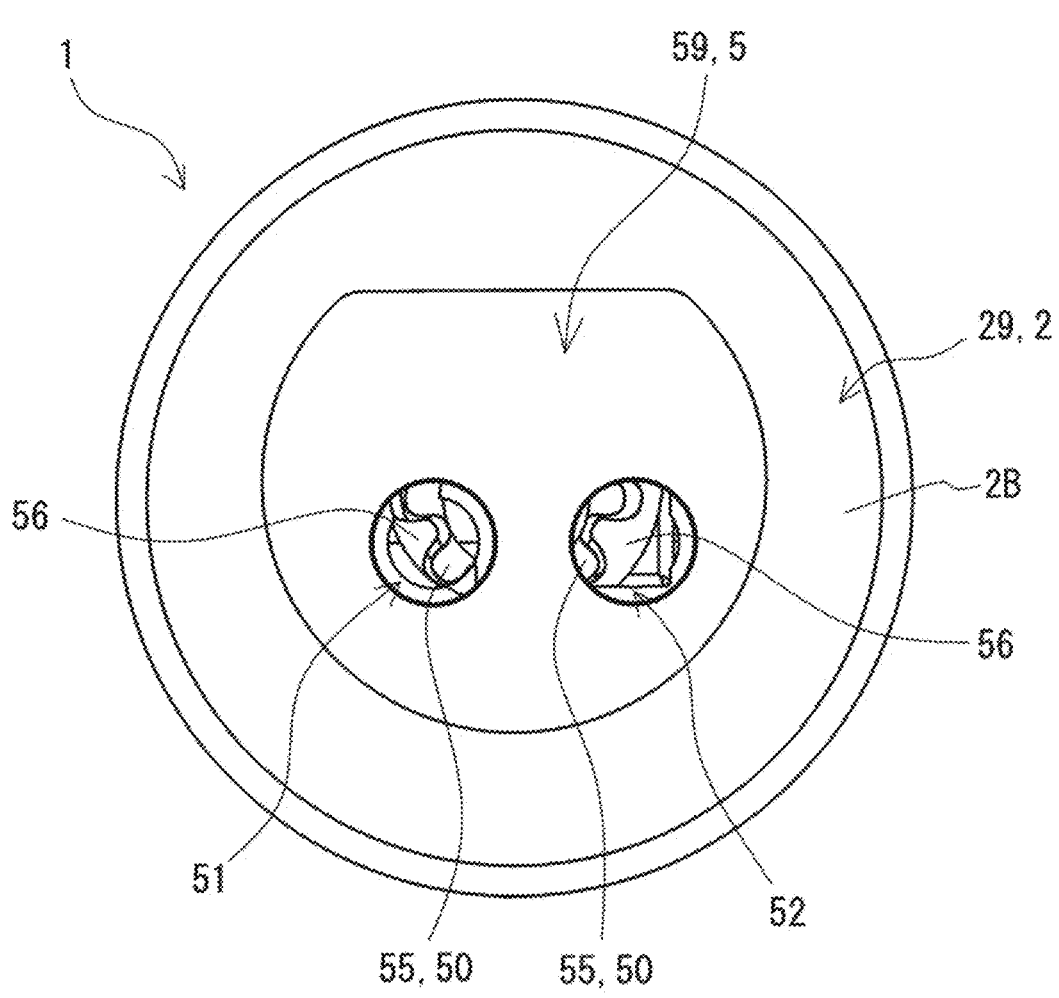
FIG. 2 is a schematic plan view of a pump assembly according to the first embodiment.

A pump assembly 1 shown in FIGS. 1 and 2 includes an axial gap motor 2 and a first pump 5. A motor housing 29 of axial gap motor 2 and a pump housing 59 of first pump 5 are visible from the outside of pump assembly 1. An inlet port 51 and an outlet port 52 are opened in pump housing 59. As shown in the plan view of FIG. 2, an external gear 55 and an internal gear 56 provided in first pump 5, which will be described later, are seen through inlet port 51 and outlet port 52. Hereinafter, each configuration of pump assembly 1 will be described. In the following description, the "axial gap motor" is simply referred to as a "motor".

<<Motor>>

Figure 3:
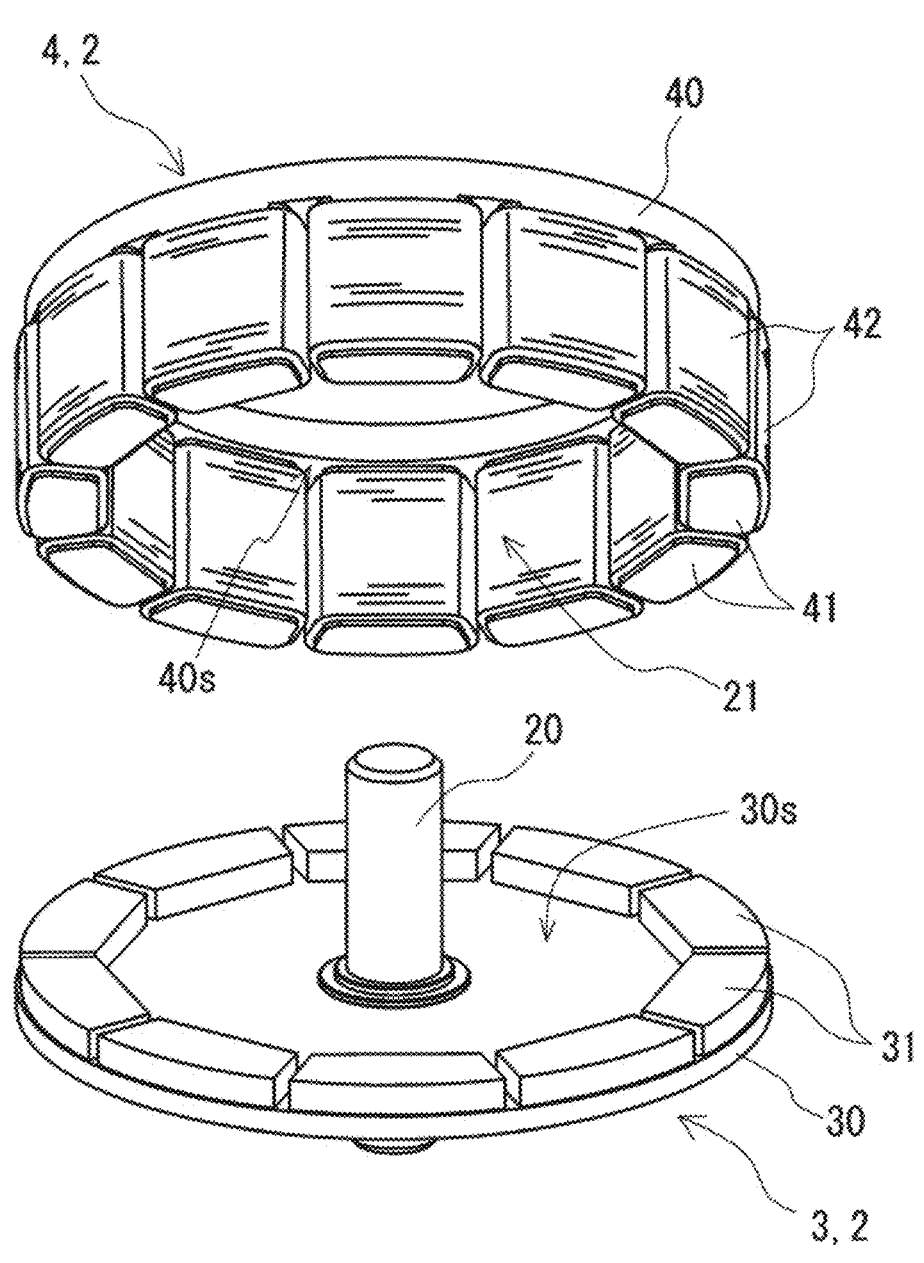
FIG. 3 is a schematic exploded perspective view of an axial gap motor provided in a pump assembly according to the first embodiment.
Figure 5:
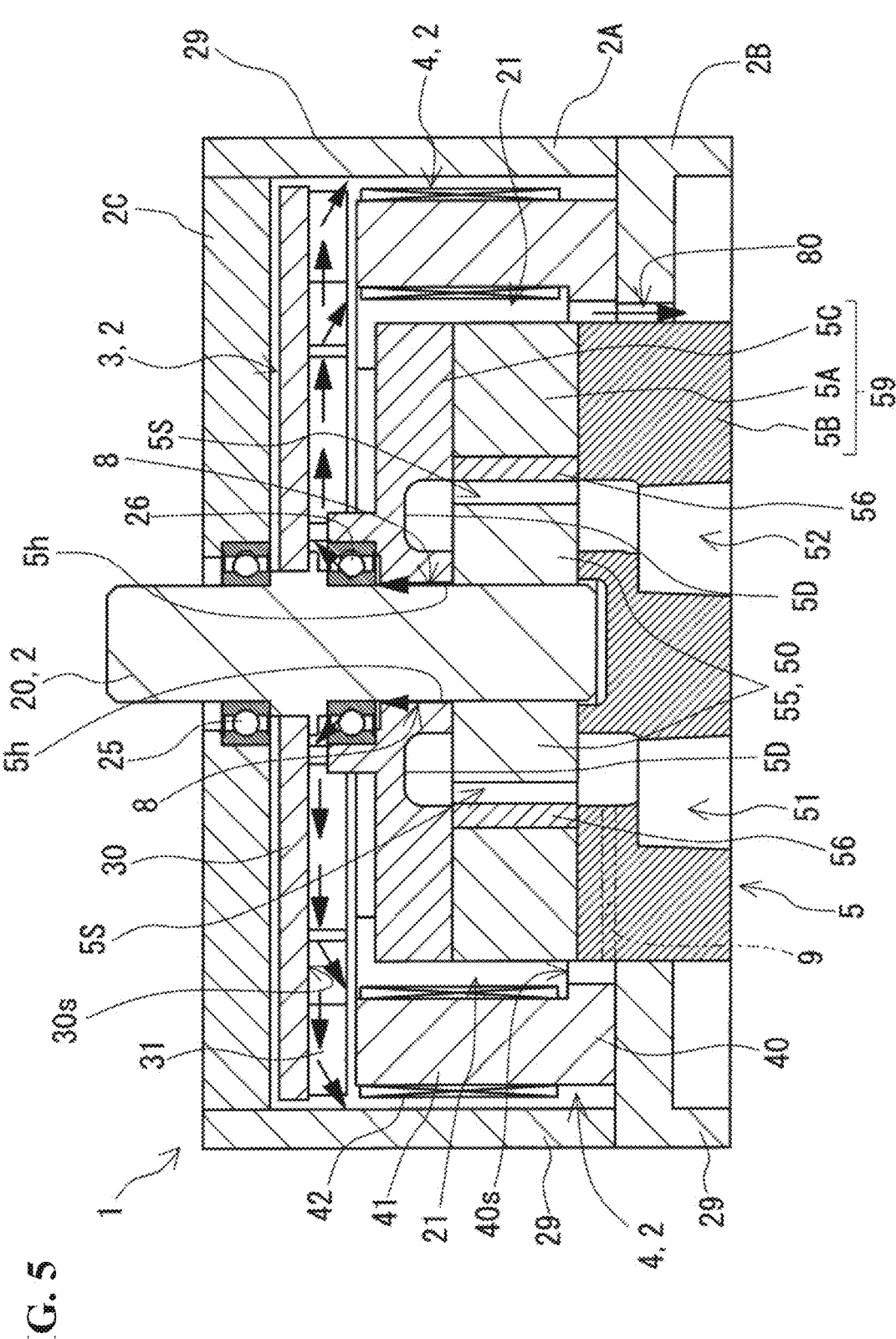
FIG. 5 is a cross-sectional view of the pump assembly of the first embodiment taken along the line V-V shown in FIG. 4.

In the description of motor 2, FIG. 3, which is an exploded perspective view of motor 2, is mainly referred to, and FIGS. 5, which is a cross-sectional view of pump assembly 1, is referred to as necessary. Motor 2 includes a first stator 4, a motor rotor 3, and a motor shaft 20. As shown in FIG. 5, first stator 4 and motor rotor 3 are disposed coaxially with motor shaft 20. First stator 4 and motor rotor 3 face each other with a gap therebetween in a direction along the axis of motor shaft 20. Motor 2 of the present embodiment is a motor of single-rotor and single-stator type including one first stator 4 and one motor rotor 3.

First stator 4 includes a first yoke 40, a plurality of first teeth 41, and a plurality of first coils 42. First yoke 40 is a plate member formed in an annular shape. First teeth 41 are columnar bodies. First teeth 41 protrude from a first surface 40s having a planar shape of first yoke 40. The plurality of first teeth 41 have the same shape and size each other. The shape of each first teeth 41 is, for example, a prismatic shape or a cylindrical shape. First stator 4 of the present embodiment is constituted by, for example, an integrated powder compact. As a modification of this embodiment, first stator 4 may be configured by a plurality of divided pieces.

The end surface of first teeth 41 faces a magnet 31 of motor rotor 3, which will be described later. First coil 42 is disposed on the outer peripheral surface of first teeth 41. When the current flows through first coil 42, first stator 4 is excited, and a rotating magnetic field is generated. In the present embodiment, the end portions of the winding constituting first coil 42 are not shown.

Motor rotor 3 includes a base plate 30 and a plurality of magnets 31. Base plate 30 is a plate member having an annular shape through which motor shaft 20 penetrates. Base plate 30 and motor shaft 20 are fixed to each other, and base plate 30 and motor shaft 20 rotate coaxially. Base plate 30 includes a base surface 30s facing first surface 40s of first yoke 40.

The plurality of magnets 31 are fixed to base surface 30s by an adhesive, for example. Magnet 31 is a permanent magnet. The plurality of magnets 31 are arranged at substantially equal intervals around the axis of motor shaft 20. Magnet 31 has, for example, a flat plate shape. The planar shape of magnet 31 is, for example, a shape corresponding to the shape of the end surface of first teeth 41. Magnet 31 is magnetized in a direction along the axis of motor shaft 20. The magnetization directions of two magnets 31 adjacent to each other around the axis of motor shaft 20 are opposite to each other. Magnet 31 is attracted to or repelled from first teeth 41 by the rotating magnetic field generated by first stator 4, whereby motor rotor 3 rotates with respect to first stator 4.

As shown in FIG. 5, motor 2 further includes motor housing 29. First stator 4 and motor rotor 3 are disposed inside motor housing 29. A portion of motor shaft 20 is also disposed inside motor housing 29. As a modification of this embodiment, entire motor shaft 20 may be disposed inside motor housing 29.

Motor housing 29 of the present embodiment is configured by a peripheral wall portion 2A, a first cover 2B, and a second cover 2C. Peripheral wall portion 2A and second cover 2C may be an integral component. Peripheral wall portion 2A is a cylindrical member. The inner diameter of peripheral wall portion 2A is larger than the outer diameter of first stator 4. The length of peripheral wall portion 2A along the axial direction of motor shaft 20 is larger than the length of first stator 4 along motor shaft 20.

First cover 2B is a member having an annular shape that seals a first end portion of peripheral wall portion 2A. The first end is an end of first stator 4 adjacent to first yoke 40. First yoke 40 is fixed to first cover 2B. A part of pump housing 59 described later is penetrated through first cover 2B. First cover 2B is provided with a flange at the edge of the outer periphery. The protruding height of pump housing 59 is the same as or lower than the end surface of the flange.

Therefore, the protruding portion of pump housing 59 is housed in a recess space formed inside the flange of first cover 2B.

Second cover 2C is a member having a circular shape that seals a second end portion of peripheral wall portion 2A. The second end is an end opposite to the first end. Second cover 2C may be a member independent of peripheral wall portion 2A, or may be integrated with peripheral wall portion 2A. Motor shaft 20 penetrates second cover 2C. A bearing 25 is disposed between second cover 2C and motor shaft 20, and motor shaft 20 is rotatably supported by second cover 2C. A seal member for suppressing leakage of fluid from motor housing 29 may be disposed at the position of bearing 25. As a modification of this embodiment, when entire motor shaft 20 is disposed in motor housing 29, the inner surface of second cover 2C includes a recess into which the end of motor shaft 20 is fitted.

<<First Pump>>

Figure 4:
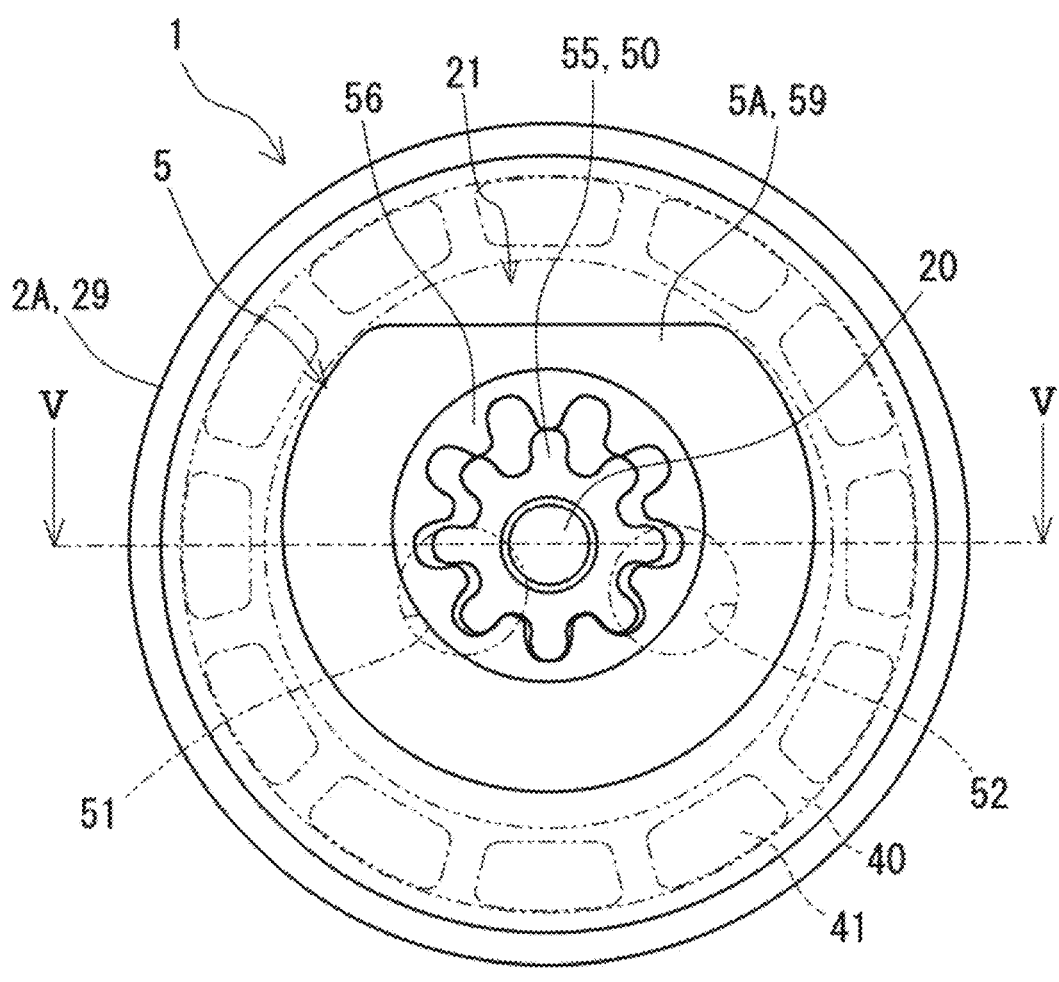
FIG. 4 is a schematic configuration view for explaining the arrangement state of a first pump in a pump assembly according to the first embodiment.

First pump 5 will be described mainly with reference to FIGS. 4 and 5. FIG. 4 is a view for explaining the arrangement state of first pump 5 in pump assembly 1, and some members of pump assembly 1 are omitted or simplified. For example, in FIG. 4, first cover 2B of motor housing 29 and motor rotor 3 are omitted. In FIG. 4, a first cover 5B (FIG. 5) of pump housing 59 described later is omitted, and a state where the inside of first pump 5 is exposed is shown. In FIG. 4, first stator 4, inlet port 51, and outlet port 52 are shown by two dot chain lines.

First pump 5 is for pumping the fluid. The fluid of the present embodiment is a liquid. For example, the fluid is machine oil. First pump 5 includes a first pump rotor 50 configured to be rotated by motor rotor 3. First pump 5 is disposed in a first internal space 21 surrounded by the plurality of first teeth 41.

First pump 5 of the present embodiment is an internal gear pump having external gear 55 and internal gear 56. External gear 55 is a disc-shaped gear having teeth on an outer periphery. The tooth profile of external gear 55 is formed by, for example, a trochoid curve. Internal gear 56 is a gear having an annular shape and teeth on the inner periphery. External gear 55 is disposed inside internal gear 56, and the teeth of external gear 55 and the teeth of internal gear 56 mesh with each other. In this internal gear pump, external gear 55 is first pump rotor 50.

External gear 55 and internal gear 56 are disposed inside pump housing 59. As shown in FIG. 5, pump housing 59 of the present embodiment is constituted by a peripheral wall portion 5A, first cover 5B, and a second cover 5C. A passage space 5S through which a fluid flows is formed in the interior of pump housing 59 surrounded by peripheral wall portion 5A, first cover 5B, and second cover 5C. Passage space 5S includes a gap between external gear 55 and internal gear 56.

Peripheral wall portion 5A is a member having a cylindrical shape. As shown in FIG. 4, the outer periphery contour of peripheral wall portion 5A viewed from the direction along the axis of peripheral wall portion 5A has a shape like a circle partially cut in a straight line. The center of the circular arc of the outer periphery contour is shifted upward from the center of motor housing 29 in FIG. 4, and coincides with the rotation center of internal gear 56 described later. Since peripheral wall portion 5A is cut, pump housing 59 can be disposed in first internal space 21 while ensuring the strength of pump housing 59. As a modification of this embodiment, the center of the arc of the outer periphery contour of peripheral wall portion 5A may not coincide with the rotation center of internal gear 56. The center of the arc of the outer periphery contour of peripheral wall portion 5A may or may not coincide with the center of rotation of external gear 55.

The inner peripheral contour line of peripheral wall portion 5A as viewed from the direction along the axis of peripheral wall portion 5A is circular. The inner diameter of peripheral wall portion 5A is slightly larger than the outer diameter of internal gear 56. Therefore, internal gear 56 can rotate while the outer peripheral surface of internal gear 56 is in contact with the inner peripheral surface of peripheral wall portion 5A. The rotation axis of internal gear 56 is stabilized by being supported by the inner peripheral surface of peripheral wall portion 5A.

As shown in FIG. 5, first cover 5B is a plate-like member that seals the first end portion of peripheral wall portion 5A. First cover 5B may be a component integrated with first cover 2B of motor housing 29. First cover 5B may be a component integrated with peripheral wall portion 5A. The first end is an end adjacent to first yoke 40. First cover 5B has through holes constituting inlet port 51 and outlet port 52. A recess is formed on the inner surface of first cover 5B. An end of motor shaft 20 is rotatably fitted in the recess.

Second cover 5C is a plate-shaped member that seals the second end portion of peripheral wall portion 5A. Second cover 5C may be a component integrated with peripheral wall portion 5A. The second end is an end opposite to the first end. A recess 5D is formed in a surface of second cover 5C facing first pump rotor 50. The number of recesses 5D in the present embodiment is two. Two recesses 5D are provided at positions facing each other across motor shaft 20. Each recess 5D has a substantially arc shape when viewed from the direction along the axis of motor shaft 20. Two recesses 5D may have different shapes or the same shape. Recess 5D reduces the sliding area between external gear 55 and second cover 5C and the sliding area between internal gear 56 and second cover 5C, thereby reducing the torque loss of first pump 5. Second cover 5C includes a through hole 5h through which motor shaft 20 penetrates. A bearing 26 is disposed between through hole 5h and motor shaft 20. Therefore, motor shaft 20 is rotatably supported by second cover 5C. The gap between through hole 5h and motor shaft 20 is very narrow. In the present embodiment, this gap is used as a leak passage 8. Details of leak passage 8 will be described later.

As shown in FIG. 4, external gear 55 is coaxially fixed to motor shaft 20. That is, the rotation axis of external gear 55 and the rotation axis of motor shaft 20 coincide with each other. The rotation axis of external gear 55 also coincides with the axis of motor housing 29. External gear 55 rotates in perfect synchronization with the rotation of motor rotor 3. Therefore, the rotational speed of external gear 55 can be controlled by controlling the rotational speed of motor rotor 3. The flow rate of the fluid pumped by first pump 5 varies depending on the rotational speed of external gear 55.

The rotation axis of internal gear 56 positioned by peripheral wall portion 5A of pump housing 59 is shifted upward from the rotation axis of external gear 55 in the figure. Therefore, internal gear 56 rotates in accordance with the rotation of external gear 55, and the gap between external gear 55 and internal gear 56 moves in the rotation direction of motor shaft 20. Inlet port 51 and outlet port 52 are opened in the gap between external gear 55 and internal gear 56. Therefore, the fluid flowing into the gap from inlet port 51 is carried in the rotational direction of motor shaft 20 and is discharged to the outside of first pump 5 from outlet port 52.

Inlet port 51 and outlet port 52 are arranged at substantially symmetrical positions with motor shaft 20 interposed therebetween. Inlet port 51 and outlet port 52 are disposed in the first direction as viewed from first pump rotor 50, that is, external gear 55. The first direction is a direction along the axis of motor shaft 20 and is a direction away from motor rotor 3. In the present embodiment, inlet port 51 and outlet port 52 are formed in first cover 5B disposed in the first direction from first pump rotor 50. Inlet port 51 and outlet port 52 of the present embodiment extend in the first direction and open on the end surface of first cover 5B. As a modification of this embodiment, inlet port 51 and outlet port 52 may be bent in an L shape, for example. In this case, inlet port 51 and outlet port 52 may be opened in a direction intersecting the first direction. Since rotating motor rotor 3 is not present at the positions where inlet port 51 and outlet port 52 are arranged, inlet port 51 and outlet port 52 can be easily arranged.

As a modification of this embodiment, inlet port 51 and outlet port 52 may extend in the radial direction. The radial direction is a direction orthogonal to the axis of motor shaft 20 and is a direction away from the axis of motor shaft 20. In this case, inlet port 51 and outlet port 52 each extend from area between two adjacent first teeth 41 to the outside of pump assembly 1.

In pump assembly 1 of the present embodiment, first pump 5 is disposed in first internal space 21 of motor 2. That is, the length of pump assembly 1 of the present embodiment along motor shaft 20 does not increase even though first pump 5 is provided. Such compact pump assembly 1 is easily arranged in a narrow space such as the interior of an automobile.

First pump 5 generates an operating noise. The operating noise is, for example, a contact noise between external gear 55 and internal gear 56, and a pulsation noise generated when the fluid is pressure-fed. External gear 55 and internal gear 56, which are sources of operating noise, are surrounded by pump housing 59. Moreover, first pump 5 is disposed inside motor 2. Therefore, in pump assembly 1 of the present embodiment, the operating noise of first pump 5 is unlikely to leak to the outside of pump assembly 1. Pump assembly 1 of the present embodiment is excellent in quietness.

Motor 2 generates heat during operation. The temperature of first pump 5 disposed in first internal space 21 of motor 2 is likely to rise due to the heat generation of motor 2. When the temperature of first pump 5 rises, the temperature of the fluid in first pump 5 rises, and the viscosity of the fluid decreases. As a result, the load of motor 2 is reduced, and the power consumption of motor 2 is reduced. In particular, after starting motor 2, where the temperature of the fluid is low, the load of motor 2 can easily be reduced early. First pump 5 disposed in first internal space 21 has a high heat capacity due to its structure. Therefore, first pump 5 easily receives heat generated by motor 2, and can suppress heat generation of motor 2.

<<Leak Passage>>

Pump assembly 1 is provided with leak passage 8. Leak passage 8 is provided for intentionally leaking a part of the fluid flowing through passage space 5S into motor housing 29.

As described above, leak passage 8 of the present embodiment is formed by the gap between through hole 5h of pump housing 59 and motor shaft 20. Through hole 5h is opened from passage space 5S toward motor rotor 3. Therefore, leak passage 8 is also opened from passage space 5S toward motor rotor 3. Since leak passage 8 is very narrow, the fluid does not excessively leak from passage space 5S, and the pumping capacity of first pump 5 is not impaired. As a modification of this embodiment, leak passage 8 may be a through hole that penetrates second cover 5C in a direction along the thickness thereof. In this case, leak passage 8 is also opened toward motor rotor 3. The inner diameter of leak passage 8 is set to a size that does not excessively reduce the pressure of the fluid in passage space 5S.

In FIG. 5, an example of the corridors for the movement of the fluid leaking into motor housing 29 through leak passage 8 is shown by the bold straight arrow. The fluid in passage space 5S leaks to motor rotor 3 through leak passage 8. In the present embodiment, bearing 26 is disposed at the position of leak passage 8. Therefore, specifically, the fluid leaks to motor rotor 3 through a gap between motor shaft 20 and bearing 26, a gap of the interior of bearing 26, and the like.

The fluid leaking from leak passage 8 adheres to base plate 30 of motor rotor 3. Here, in FIG. 5, only the side surface of magnet 31 is visible, the side surface being located in an area further back in the paper than the cross section of base plate 30. As shown in FIG. 3, magnet 31 is not arranged in the center portion of base plate 30. Therefore, the fluid leaking from leak passage 8 adheres to base surface 30s of base plate 30, not to magnet 31. The fluid attached to base surface 30s moves in a direction away from the rotation axis of motor rotor 3 by the centrifugal force of motor rotor 3. A part of the moving fluid is scattered in first internal space 21 and adheres to first stator 4. The dispersed fluid in motor housing 29 draws heat from the components of motor 2 and cool motor 2. Therefore, although pump assembly 1 of the present embodiment is not provided with an additional cooling mechanism, a problem associated with heat generation is unlikely to occur.

<<Drain Passage>>

Pump assembly 1 of the present embodiment further includes a drain passage 80 connected to the interior and the exterior of motor housing 29. In the present embodiment, drain passage 80 is provided in first cover 5B. Drain passage 80 is provided to discharge the fluid in motor housing 29 to the outside. When the viscosity of the fluid is high, motor rotor 3 is difficult to rotate due to the fluid accumulated in the interior of motor 2. By discharging the fluid in motor housing 29 to the outside through drain passage 80, suppression of the rotation of motor rotor 3 by the fluid is prevented.

The opening of drain passage 80 faces the outside faces vertically downward. Therefore, the fluid is quickly discharged from drain passage 80 by gravity.

As a modification of this embodiment, drain passage 80 may be provided in peripheral wall portion 2A. Drain passage 80 provided in peripheral wall portion 2A extends in a direction intersecting motor shaft 20, for example, in a direction orthogonal to motor shaft 20. In this case, the fluid can be accumulated in motor housing 29 to the height of drain passage 80, and motor 2 is easily cooled. Of course, pump assembly 1 may be disposed such that motor shaft 20 extends along the horizontal direction, and the opening of drain passage 80 may be directed vertically downward to positively discharge the fluid from motor housing 29.

<<Return Passage>>

Pump assembly 1 may include a return passage 9, which is indicated by a two dot chain line. Return passage 9 connects first internal space 21 and inlet port 51. Return passage 9 allows the fluid leaked into motor housing 29 to be returned to passage space 5S of first pump 5. Return passage 9 illustrated in FIG. 5 is provided in pump housing 59. Specifically, first cover 5B is provided with return passage 9.

Second Embodiment

Figure 6:
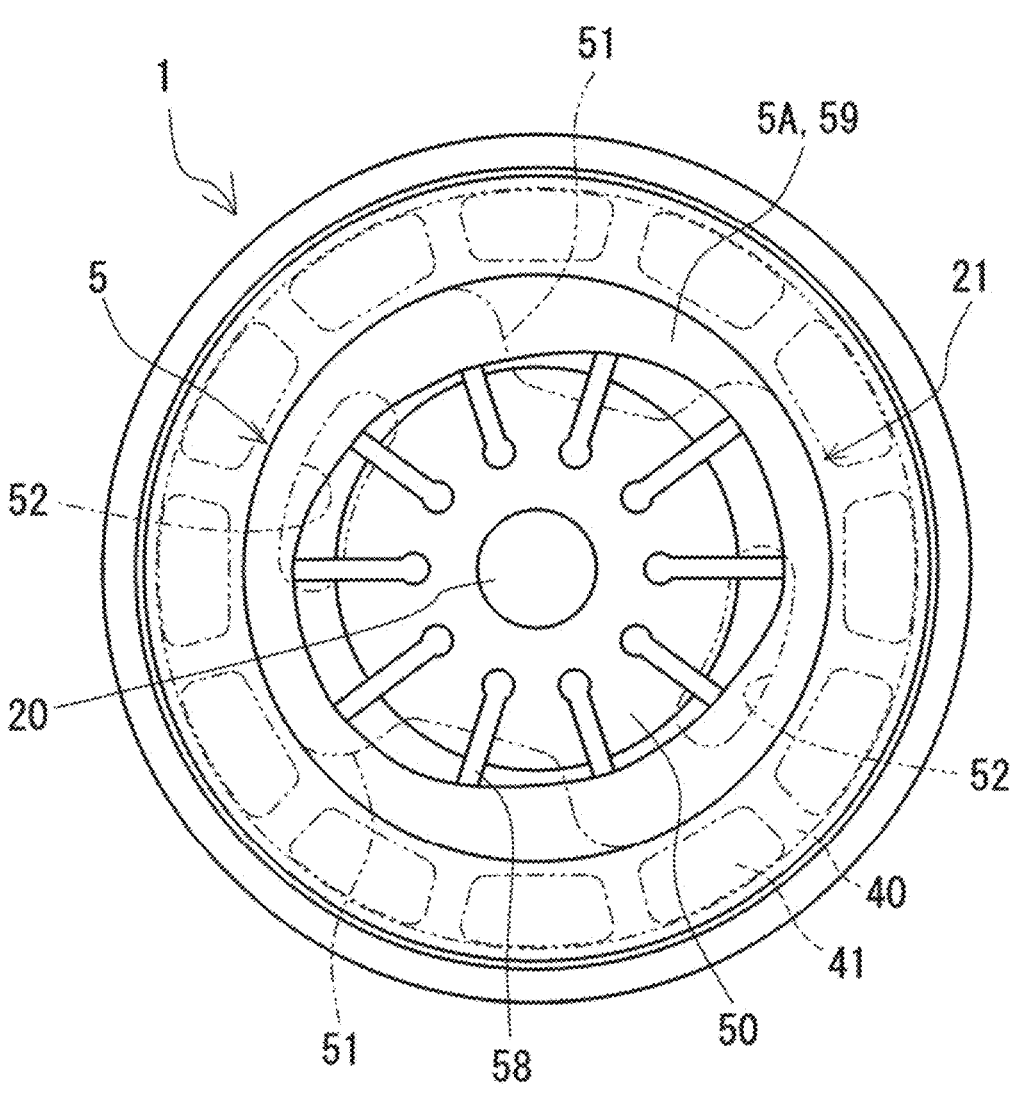
FIG. 6 is a schematic configuration view for explaining an arrangement state of a first pump in a pump assembly according to the second embodiment.

First pump 5 provided in pump assembly 1 is not limited to an internal gear pump. For example, first pump 5 may be an external gear pump, an impeller pump, a diaphragm pump, a vane pump, or a piston pump. In the second embodiment, pump assembly 1 including a vane pump as first pump 5 will be described with reference to FIG. 6. The view of FIG. 6 is the same as that of FIG. 4.

The vane pump includes first pump rotor 50 having a plurality of vanes 58. Vane 58 is configured to be movable forward and backward by, for example, a magnetic force or a centrifugal force. As viewed from the direction along the axis of motor shaft 20, the shape of the inner circumferential surface of pump housing 59 in which first pump rotor 50 is housed is substantially elliptical. As a modification of this embodiment, the shape of the inner circumferential surface of pump housing 59 may be circular. As first pump rotor 50 rotates, the end of vane 58 comes into contact with the inner circumferential surface of pump housing 59, and vane 58 moves forward or backward. The fluid is in the space surrounded by two adjacent vanes 58, 58, the inner circumferential surface of pump housing 59, and first pump rotor 50, and the fluid is carried in the rotation direction of first pump rotor 50 as first pump rotor 50 rotates. The vane pump has excellent sealing performance, and therefore can easily pump a gas, a liquid, or a mixture of a gas and a liquid.

Pump assembly 1 of the present embodiment includes two inlet ports 51 and two outlet ports 52. Inlet ports 51 and outlet ports 52 are alternately arranged around the axis of motor shaft 20. There may be one inlet port 51 and one outlet port 52.

Third Embodiment

Figure 7:
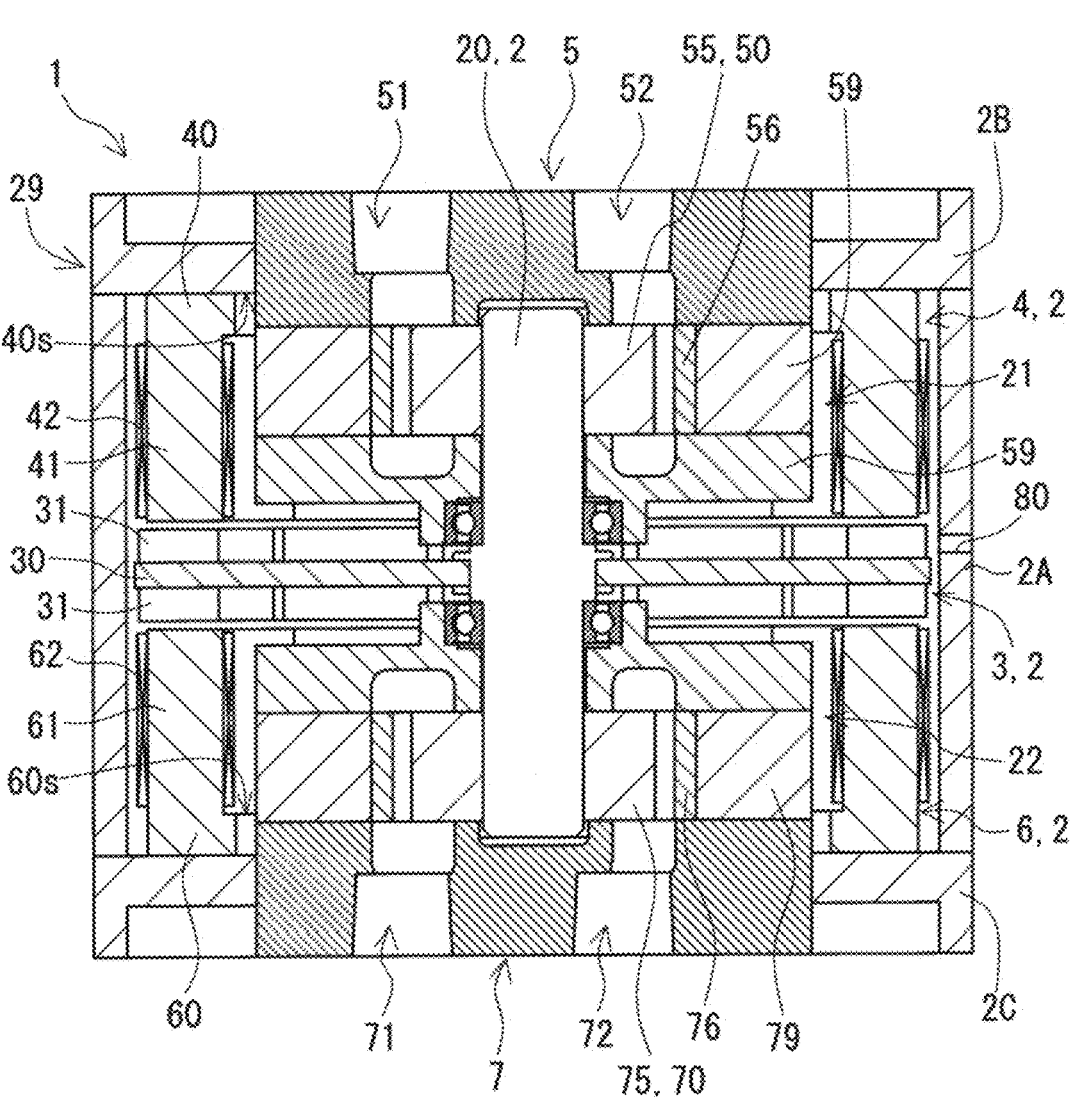
FIG. 7 is a schematic cross-sectional view of a pump assembly according to the third embodiment.

In the third embodiment, pump assembly 1 including motor 2 of a single-rotor and double-stator type will be described with reference to FIG. 7. The view of FIG. 7 is similar to that of FIG. 5. In FIG. 7, the details of leak passage 8 and the corridors for the movement of the fluid are not shown.

Motor 2 of the present embodiment further includes second stator 6 that sandwiches motor rotor 3 between first stator 4 and second stator 6. Second stator 6 has the same configuration as first stator 4. That is, second stator 6 includes a second yoke 60 having an annular shape, a plurality of second teeth 61, and a plurality of second coils 62. Second teeth 61 are disposed on a second surface 60s of second yoke 60. Second surface 60s is a surface facing first surface 40s of first yoke 40. The end surface of second teeth 61 has the same shape as the end surface of first teeth 41 and faces the end surface of first teeth 41. That is, first stator 4 and second stator 6 are disposed symmetrically with respect to motor rotor 3.

Motor rotor 3 of the present embodiment also has the plurality of magnets 31 on the surface facing second stator 6. As a modification of this embodiment, magnet 31 may be embedded in base plate 30. In this case, one magnet 31 corresponds to both first stator 4 and second stator 6.

Motor 2 of a single-rotor and double-stator type is usually more space efficient than motor 2 of a single-rotor and single-stator type.

Motor 2 has a second internal space 22 surrounded by a plurality of second teeth 61. A second pump 7 is disposed in second internal space 22. That is, first pump 5 and second pump 7 are disposed symmetrically with respect to motor rotor 3. Second pump 7 is a pump independent of first pump 5. Second pump 7 has the same configuration as first pump 5. That is, second pump 7 is an internal gear pump having an external gear 75 and an internal gear 76. External gear 75 is a second pump rotor 70 configured to be rotated by motor rotor 3. Specifically, second pump rotor 70 is coaxially fixed to motor shaft 20. That is, motor shaft 20 serves as a rotation shaft of first pump rotor 50 and second pump rotor 70. External gear 75 and internal gear 76 are disposed inside a pump housing 79. As a modification of this embodiment, first pump 5 and second pump 7 may be pumps of types other than the internal gear pump. First pump 5 and second pump 7 may be pumps of different types. For example, first pump 5 may be an internal gear pump, and second pump 7 may be a vane pump.

An inlet port 71 and an outlet port 72 extend along the axis of motor shaft 20. The opening of inlet port 71 and the opening of outlet port 72 are disposed at positions away from motor rotor 3. Since rotating motor rotor 3 is not present at the positions where inlet port 71 and outlet port 72 are arranged, inlet port 71 and outlet port 72 can be easily arranged.

Peripheral wall portion 2A of motor housing 29 has a size capable of housing both first pump 5 and second pump 7. Therefore, pump assembly 1 of the present embodiment is compact despite having two pumps.

In the present embodiment, drain passage 80 is provided in peripheral wall portion 2A. Pump assembly 1 is disposed such that drain passage 80 faces vertically downward, and thus the fluid in motor housing 29 is easily discharged to the outside.

First cover 2B of motor housing 29 of the present embodiment has the same configuration as first cover 2B of the first embodiment. Second cover 2C of motor housing 29 of the present embodiment has the same configuration as first cover 2B. Therefore, although a part of pump housing 79 penetrates second cover 2C, pump housing 79 does not protrude from the end surface of second cover 2C. As a modification of this embodiment, pump housing 59 may protrude from the end surface of first cover 2B, and pump housing 79 may protrude from the end surface of second cover 2C.

Pump assembly 1 of the present embodiment having the configuration described above can pressure-feed the fluids of two independent systems.

REFERENCE SIGNS LIST 1 pump assembly
2 axial gap motor, motor
20 motor shaft
21 first internal space
22 second internal space
25, 26 bearing
29 motor housing
2A peripheral wall portion
2B first cover
2C second cover
3 motor rotor
30 base plate
30s base surface
31 magnet
4 first stator
40 first yoke
40s first surface
41 first teeth
42 first coil
5 first pump 5h through hole,
5S passage space
50 first pump rotor
51 inlet port
52 outlet port
55 external gear
56 internal gear
58 vane
59 pump housing
5A peripheral wall portion
5B first cover
5C second cover
5D recess
6 second stator
60 second yoke
60s second surface
61 second teeth
62 second coil
7 second pump
70 second pump rotor
71 inlet port
72 outlet port
75 external gear
76 internal gear
79 pump housing
8 leak passage
80 drain passage
9 return passage

The invention claimed is:

1. A pump assembly comprising:
an axial gap motor including a stator, a motor rotor, and a motor shaft; and
a pump including a pump rotor configured to be rotated by the motor rotor and a pump housing configured to house the pump rotor,
wherein the stator includes
a yoke having an annular shape, and
a plurality of teeth disposed on a first surface of the yoke,
wherein the pump is disposed in an internal space surrounded by the plurality of teeth, and
wherein the pump housing has
a passage space formed in an interior of the pump housing, and
a leak passage opened from the passage space toward the motor rotor.

2. The pump assembly according to claim 1,
wherein the pump housing has a through hole communicating with the interior and an outside of the pump housing,
wherein a portion of the motor shaft is disposed in the interior of the pump housing by extending through the through hole, and
wherein the leak passage is formed of a gap between the through hole and the motor shaft.

3. The pump assembly according to claim 1,
wherein the pump has an inlet port and an outlet port,
wherein the inlet port and the outlet port are arranged in a first direction as viewed from the pump rotor, and
wherein the first direction is a direction along an axis of the motor shaft and is a direction away from the motor rotor.

4. The pump assembly according to claim 1, wherein the axial gap motor includes a motor housing, and wherein the motor housing has a drain passage communicating with an interior and an outside of the motor housing.

5. The pump assembly according to claim 1, wherein the pump is an internal gear pump including an external gear and an internal gear, and wherein the external gear is the pump rotor.

6. The pump assembly according to claim 1, wherein the pump is a vane pump, and wherein the pump rotor includes a plurality of vanes.

7. The pump assembly according to claim 3, wherein the pump housing has a return passage configured to allow communication between the internal space and the inlet port.

\* \* \* \* \*